United States Patent

[11] 3,601,351

| [72] | Inventor | Manfred Ambrosius<br>Langenfeld-Richrath, Germany |
|---|---|---|
| [21] | Appl. No. | 777,800 |
| [22] | Filed | Nov. 21, 1968 |
| [45] | Patented | Aug. 24, 1971 |
| [73] | Assignee | Bremshey & Co.<br>Solingen-Ohligs, Germany |
| [32] | Priority | Nov. 22, 1967 |
| [33] | | Germany |
| [31] | | B 73 567 |

[54] SEAT FOR AUTOMOTIVE VEHICLES
1 Claim, 5 Drawing Figs.

[52] U.S. Cl. .................................................. 248/400
[51] Int. Cl. .................................................. A47c 3/30
[50] Field of Search ...................................... 248/400;
247/131, 65; 137/513.3, 513.7

[56] References Cited
UNITED STATES PATENTS

| 2,929,399 | 7/1965 | Magowan, Jr. ............... | 137/513.7 |
| 2,930,572 | 3/1960 | Hursen .......................... | 137/513.3 |
| 3,193,239 | 7/1965 | Monroe ......................... | 248/400 |
| 3,265,345 | 8/1966 | Vuichard ....................... | 248/400 |
| 3,300,203 | 1/1967 | Carter et al. ................... | 248/400 |
| 3,405,901 | 10/1968 | Gregoire ...................... | 248/400 |

*Primary Examiner*—Edward C. Allen
*Attorney*—Ernest G. Montague

ABSTRACT: A seat for an automotive vehicle having a supporting surface suspended on swingable members and adjustable in vertical direction, which comprises means for displacing the bearing surface hydropneumatically in a shock-absorbing manner, and a single-acting hydraulic cylinder is arranged which defines a pressure chamber and which supports the seat. A hydraulic accumulator is also arranged which includes a reduced passage cross section. The hydraulic cylinder communicates with the hydraulic accumulator. A pressure auxiliary cylinder and a piston movable in the auxiliary cylinder are provided. The auxiliary cylinder is variable as to its volume by the piston, the latter mechanically and forcibly adjusting its position in the auxiliary cylinder. The pressure chamber is also in communication with the auxiliary cylinder.

PATENTED AUG 24 1971

3,601,351

SEAT FOR AUTOMOTIVE VEHICLES

The present invention relates to a seat, in particular for automotive vehicles, having a bearing surface adjustable as to its height and preferably suspended on swingable members and supported by means of a hydraulic-pneumatic cylinder.

For the purpose of the control of the resiliency and damping effect, in a known structure of such seats, the hydraulic cylinder carrying the seat is designed double-acting and equipped with a two-circuit pressure system, which is coupled together by means of a compensation cylinder equipped with a cantilever piston. In one of the pressure circuits, a chamber having a gas pillow (hydraulic accumulator) is provided which maintains the pressure fluid under a predetermined pressure. In the other of the pressure circuits, a return valve and a setting valve are disposed in parallel in a two-way conduit. Such apparatus operates with a more or less dampened repulsion depending upon the positions; it is, however, pertaining to the carrying force of the seat, dependent upon the pressure force of the gas pillow in its pressure chamber. Accordingly, in this arrangement, a complicated change of the gas pressure is required if a harder or softer seat resiliency is desired.

It is one object of the present invention to provide a seat for automotive vehicles which comprises an apparatus adjustable in simplest manner endlessly to the weight of the driver in a hydraulic-pneumatic system of a vehicle seat serving the production of the spring force and a damping, and thereby to obtain an advantageous noncomplicated design as an assembly unit.

It is another object of the present invention to provide a seat for automotive vehicles, wherein a pressure chamber of a single-acting hydraulic cylinder, carrying the seat, which hydraulic cylinder is in communication with a hydraulic accumulator over a reduced passage cross section, is in communication with a pressure auxiliary cylinder variable as to its volume by means of a mechanically forcibly settable piston.

Advantageously, it is possible to form the hydraulic cylinder, the hydraulic accumulator and the pressure auxiliary cylinder in a T-shaped arrangement relative to each other as one assembly unit, such in the seat, that the hydraulic cylinder extends in the direction of the back rest and the auxiliary pressure cylinder disposed coaxially with the hydraulic accumulator is arranged in horizontal direction within the range of the seat frame.

The reduced passage cross section is formed advantageously by a nozzle bore in a liftable valve plate in the hydraulic accumulator.

Due to this novel design, in addition to the obtained endless setting of the weight of the driver the following additional advantages are brought about: A simple, compact structure, the adjusting force is small and is to be exercised easily manually on a setting spindle; and the adjusting force operates independently from the damping.

With these and other objects in view, which will become apparent in the following detailed description, the present invention, which is shown by example only, will be clearly understood in connection with the accompanying drawings, in which.

Figure 1:
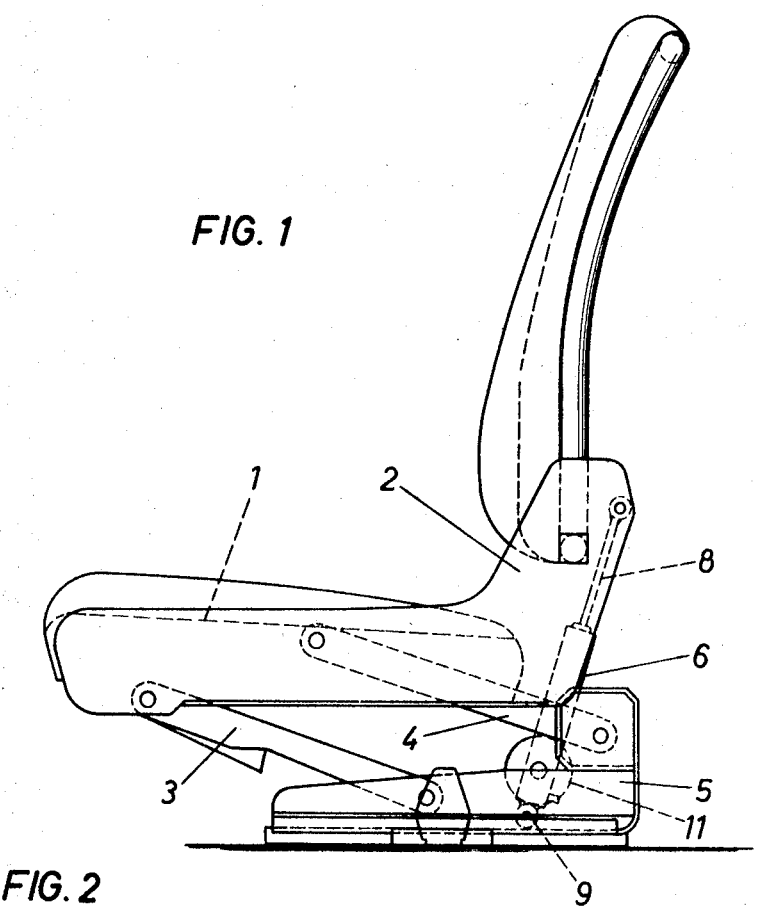
FIG. 1 is a side elevation of the vehicle seat showing the displacement in a side view.
Figure 2:
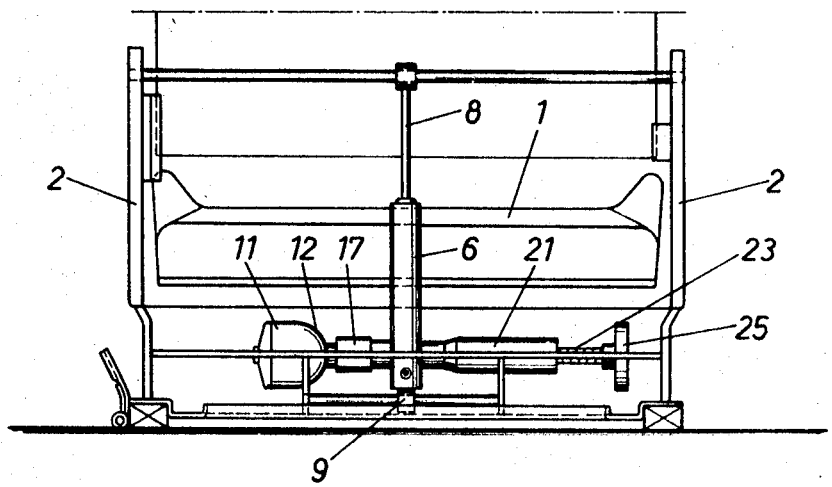
FIG. 2 is a rear elevation of the seat.

Referring now to the drawings, the seat is displaceably arranged and comprises a supporting face 1, which is displaceably arranged by means of a carrier 2 of the supporting face and pairs of members 3 and 4, swingable as to different heights, securable to a seat frame 5 at the bottom of the vehicle. The resilient force serving to carry or support the seat moves thereby a hydraulic piston 7 upwardly, the latter engaging by means of a connecting rod 8 the seat face carrier 2, while the cylinder bottom formed as a pivot eye 9 is pivotally connected to the seat frame 5. The piston 7 is disposed in a hydraulic cylinder 6 which is single-acting.

Figure 3:
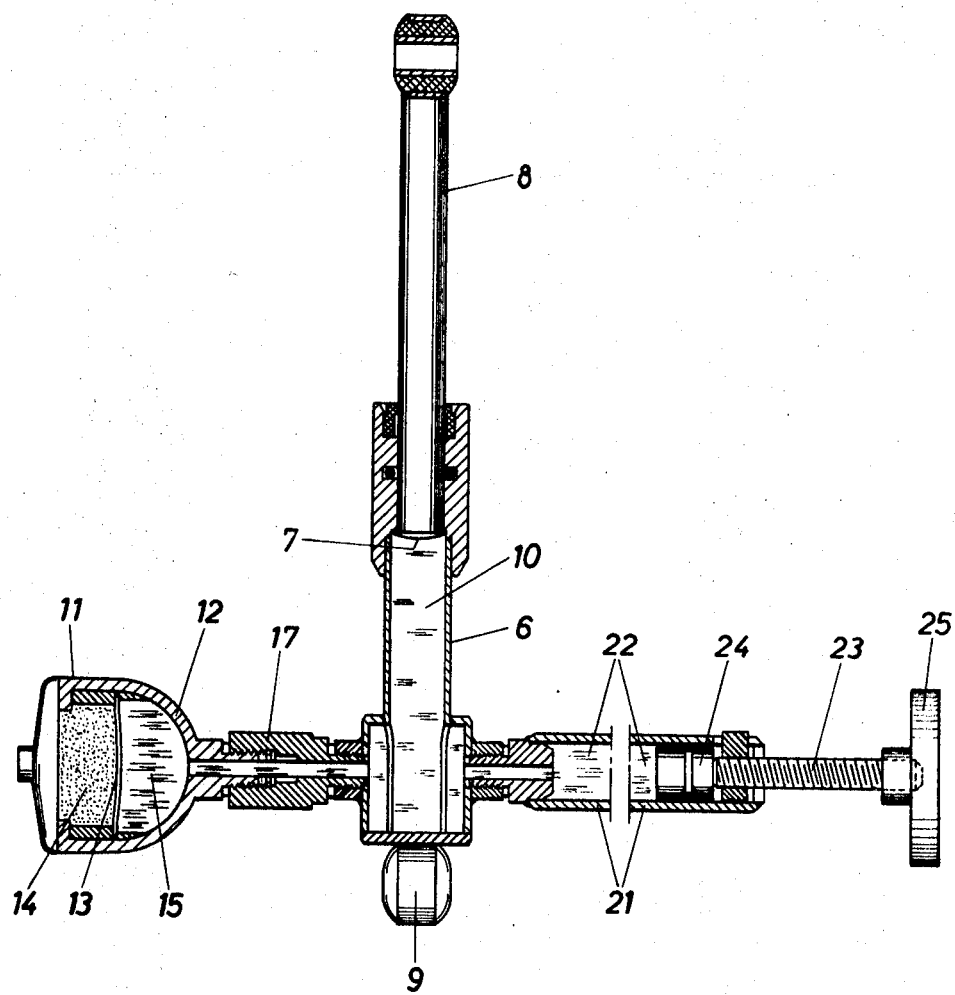
FIG. 3 is a longitudinal section, shown at an enlarged scale, of the hydraulic cylinder in addition to the hydraulic accumulator and the pressure auxiliary cylinder.

The inner chamber 10 of the hydraulic cylinder 6 (FIG. 3) communicates with a hydraulic accumulator 11 and in particular by means of a throttle position with a reduced passage cross section.

Figure 4:
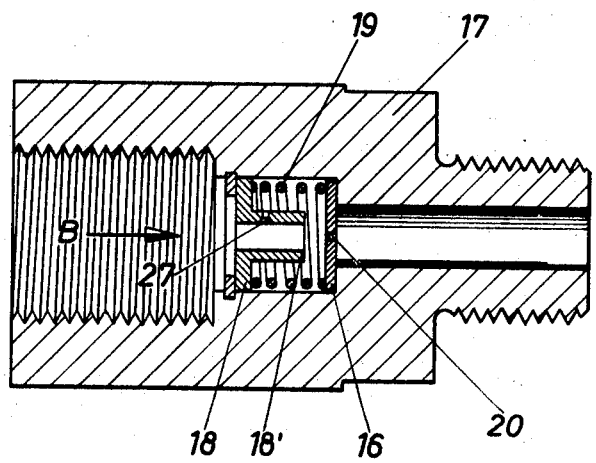
FIG. 4 is a fragmentary longitudinal section of the reduced passage cross section, shown at an enlarged scale.
Figure 5:
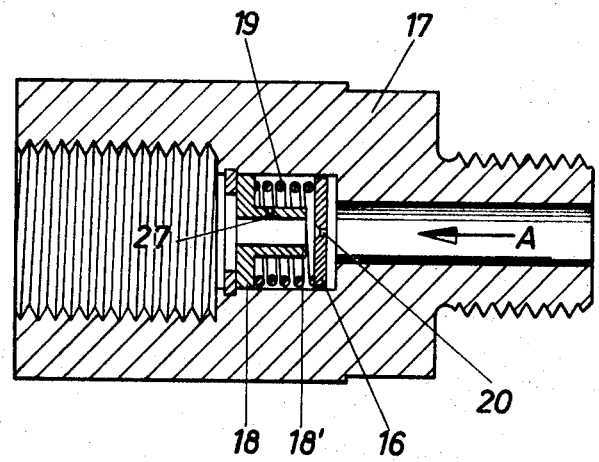
FIG. 5 is a corresponding fragmentary axial section of the arrangement shown in FIG. 4 in operative position.

The hydraulic accumulator 11 comprises a balloon-shaped container 12, which is divided into two chambers 14 and 15 by means of a flexible membrane 13, whereby the chamber 14 contains a gas subjected to high pressure, for instance, nitrogen, while the hydraulic fluid enters the chamber 15, which fills up the cylinder 6 and its inner chamber 10, respectively. The latter is in communication with the hydraulic accumulator 11 by means of a reduced passage cross section, which is disposed at a liftable valve engaging plate 16 of a return valve (FIGS. 4 and 5). In the housing 17 of this valve is arranged a sleevelike valve seat 18, the annular seat 18' of which is disposed at a predetermined distance from the engaging plate 16, so that the movement of the plate rendered possible by a valve spring 19, as shown in FIG. 5, can take place with formation of a valve gas next to the seat 18'. Under circumstances also the plate 16 can be positioned on the valve seat 18. Then the resilient damping takes place by the nozzle bore 20 constituting the reduced cross section as well as by a secondary bore 27, (FIGS. 4 and 5), provided in the jacket of the sleeve. The plate 16 has a smaller diameter than the diameter of the cylindrical housing receiving the same (FIG. 5), so that an annular split is formed for the feeding of the pressure fluid to the secondary nozzle bore 27. This annular split is closed, however, in case of a face engagement of the plate 16 (FIG. 4). For the return flow during the resilient reaction, only the path through the nozzle bore 20 alone is available.

A pressure auxiliary cylinder 21 is coordinated in a T-like arrangement to the hydraulic cylinder 6 and the hydraulic accumulator 11.

The pressure auxiliary cylinder 21 has an appreciably sized cylinder chamber 22, which is filled with the hydraulic fluid. In the cylinder 21 is disposed a piston 24 adjustable by means of a spindle 12, and a hand wheel 25 is secured to the free end of the spindle which is threadedly guided in the cylinder bottom.

The previously described setting device is formed as an assembly unit and is arranged on the seat frame such that the hydraulic cylinder 6 extends in the direction of the back rest and the pressure auxiliary cylinder which is disposed coaxially to the hydraulic accumulator 11 is arranged horizontally within the range of the seat frame 5.

The operation of the described embodiment is as follows:

The gas pressure of the chamber 14 is transmitted by means of the membrane 13 to the hydraulic fluid in the chamber 15 and produces a supporting pressure effective on the piston 7 of the hydraulic cylinder 6. In order to set the latter endlessly to the weight of the driver, the piston 24 of the pressure auxiliary cylinder 21 is adjustable by means of the hand wheel 25. The cylinder space 22 will be varied thereby but produces, by example, a pressure increase in the hydraulic cylinder 6.

The damping of the repulsion in case of a support resiliently yielding due to traveling jolts takes place in such a manner that, during the so-called resilient adjustment in the direction of flow A (FIG. 5), the valve plate 16 is lifted from its support step on the housing 17, whereby the hydraulic fluid flows through the annular space around the plate 16 and the valve-split, nonthrottled, and through the bore 27, weakly throttled, respectively. In the opposite direction of flow B (exertion of spring pressure, FIG. 4), the plate 16 presses itself to its engaging base in the housing 17. The hydraulic fluid can now flow backwardly strongly throttled through the nozzle bore 20.

While I have disclosed several embodiments of the present invention, it is to be understood that these embodiments are given by example only and not in a limiting sense.

Claim

1. A hydraulic pneumatic seat support for vehicles, comprising a telescopic shortenable support comprising a hydraulic cylinder with a support piston, and a pressure chamber in the hydraulic cylinder containing a hydraulic fluid the volume of which is variable, an auxiliary cylinder operatively communicating with said pressure chamber of said hydraulic cylinder, an auxiliary piston slidably disposed in said auxiliary cylinder, a screw spindle abuttingly connected to said auxiliary piston for mechanically and forcibly shifting said auxiliary piston, a hydraulic accumulator having an entrance side in front thereof operatively communicating with said pressure chamber of said hydraulic cylinder, a cylindrical housing and formed with an inwardly directed annular wall constituting a valve abutment, a return valve including a plate having central bore and having a diameter smaller than that of said cylindrical housing and movably disposed therein with a front side thereof adjacent said valve abutment and arranged at said entrance side of said hydraulic accumulator and said central bore and the space between the periphery of said plate and said cylindrical housing forming throttles defining two different sizes cross sections operatively disposed so that when said support piston is shifted in said hydraulic cylinder so as to reduce the volume of said pressure chamber, there is caused a movement of said plate away from said valve abutment and a streaming thereby opening the larger of said throttle cross sections constituting said space between said periphery of said plate and said cylindrical housing which then communicates said hydraulic accumulator with said hydraulic cylinder, and when said support piston return shifts so as to increase the volume of said pressure chamber, said plate is moved against said valve abutment thereby causing a streaming opening the smaller of said throttle cross sections, the latter constituting said central bore, a sleeve member having a longitudinal opening therein and disposed in said housing spaced from the wall of said housing and having an abutment surface adjacent the rear side of said plate, spring means biasing said plate toward said valve abutment, and said sleeve member having a bore through its wall which is substantially smaller than said longitudinal opening, whereby when said support piston is shifted with a predetermined pressure in said hydraulic cylinder reducing the volume of said pressure chamber, there is caused a movement of said plate against said abutment surface causing a streaming through said space between said periphery of said plate and said bore through said wall of said sleeve, as well as through a second path constituting said central bore of said plate and said longitudinal opening of said sleeve, said central bore communicating with said longitudinal opening.